(12) United States Patent
Zimmerman

(10) Patent No.: US 8,154,451 B2
(45) Date of Patent: Apr. 10, 2012

(54) ADAPTIVE USE OF POLARIZATION AS A MEANS OF INCREASED WIRELESS CHANNEL CAPACITY

(76) Inventor: Robert Mitchell Zimmerman, Pasadena, CA (US)

( * ) Notice: Subject to any disclaimer, the term of this patent is extended or adjusted under 35 U.S.C. 154(b) by 373 days.

(21) Appl. No.: 12/558,555

(22) Filed: Sep. 13, 2009

(65) Prior Publication Data

US 2011/0065449 A1    Mar. 17, 2011

(51) Int. Cl.
- *H01Q 21/06* (2006.01)
- *H01Q 21/24* (2006.01)
- *H04B 7/10* (2006.01)

(52) U.S. Cl. .................................................... 342/361

(58) Field of Classification Search .................. 342/361
See application file for complete search history.

(56) References Cited

U.S. PATENT DOCUMENTS

| | | | | |
|---|---|---|---|---|
| 4,512,024 A * | 4/1985 | Gutleber | ...................... | 375/254 |
| 4,757,319 A * | 7/1988 | Lankl | ........................... | 342/378 |
| 5,235,633 A * | 8/1993 | Dennison et al. | ......... | 455/456.3 |
| 5,933,788 A * | 8/1999 | Faerber et al. | ............. | 455/562.1 |
| 5,936,575 A * | 8/1999 | Azzarelli et al. | ............ | 342/362 |
| 6,411,824 B1 * | 6/2002 | Eidson | ........................ | 455/561 |
| 7,068,990 B1 * | 6/2006 | Herbig | ......................... | 455/295 |
| 8,115,676 B2 * | 2/2012 | Walker et al. | ................ | 342/361 |
| 2004/0127175 A1* | 7/2004 | Lucidarme et al. | .......... | 455/101 |
| 2006/0232467 A1* | 10/2006 | Small | ..................... | 342/357.09 |

* cited by examiner

*Primary Examiner* — Thomas Tarcza
*Assistant Examiner* — Frank J. McGue

(57) ABSTRACT

A mobile transceiver uses position and/or orientation knowledge to increase the capacity of a wireless link by transmitting over multiple electromagnetic polarizations. Sensors may include accelerometers, compasses, position sensors such as GPS receivers, and other means of determining the relative orientation of a mobile tranceiver to its base station. This information is used to properly shape transmitted signals and correlate received signals to increase the link capacity of the wireless link, either through channel multiplexing or increased link quality. This is particularly useful for mobile phones used on cellular networks utilizing high data volume on the allocated spectrum.

4 Claims, 2 Drawing Sheets

ADAPTIVE USE OF POLARIZATION AS A MEANS OF INCREASED WIRELESS CHANNEL CAPACITY

CROSS REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

1. Field

This application is in the technical field of wireless communications, more particularly to a system or method for increasing capacity or usability of a wireless channel.

2. Prior Art

Wireless signal transmission utilizing electromagnetic radiation inherently requires dealing with the effects of electromagnetic (EM) field polarization of the transmitted signal. As radio frequency (RF) signals are manifested as transverse waves, the polarization of the electric and magnetic fields is determined by the phasing of the electric and magnetic field components of the wave. Typical transmitter/receiver pairs utilize horizontal, vertical, circular, or sometimes elliptical polarization of RF signals. Typically, selection of an appropriate polarization in a design involves tradeoffs between simplicity of implementation and the signal-to-noise ratios (SNRs) of the transmitter/receiver pair. Increased SNR can allow for increased data rates within the allocated RF spectrum to an extent, but this is limited ultimately by the total allocated bandwidth.

Several methods for using polarization to increase RF channel data capacity currently exist. These methods typically employ matching of polarization between transmitter and receiver, as well as creating multiple channels by transmitting on overlapping frequency bands at different polarizations. Matched polarization typically increases the gain and SNR of a channel. If both the receiver and transmitter antenna orientations are known, transmitted energy can be focused into a specific polarization that matches that of the receiver, typically allowing greater gain or link margin. Prior work in this area is shown by Shapira et al. in U.S. Pat. No. 6,889,061 and Dent in U.S. Pat. No. 5,724,666 which entails the use of matched polarization to increase SNR. In both cases, identical signals are transmitted on multiple polarizations to increase signal strength. However, this does not inherently lead to increased data rate or more efficient use of frequency allocations and cannot increase the absolute maximum capacity of the channel.

Adaptive polarization techniques, described in U.S. Pat. Nos. 6,646,615, 6,411,824, 6,963,619, and 6,889,061 to Andrews et al., Eidson, Gesbert et al., and Shapira et al., respectively, show the use of various techniques to detect the polarization of the incoming signal. This is used to increase the SNR of the link at a base station and in some cases used to boost the SNR of the link to the mobile station by transmitting on the same polarization. Gesbert et al. use a method of singular value decomposition for the detection of the polarization. Andrews et al. take advantage of scattering of incoming signals. All of these techniques can be used to increase signal reception and increase in spatial diversity. However, none of these techniques are able to increase the maximum theoretical data rate of a single link beyond the frequency allocation nor are they able to take advantage of any knowledge the mobile transceiver may have of its own orientation to the tower.

Transmitting data at multiple polarizations on the same spectrum allows for an increase in data rate up to a theoretical maximum of double the normal bandwidth. This is typically used in applications such as satellite television where RF spectrum is valuable and both receiver and transmitter orientations are well known. This is shown in U.S. Pat. No. 5,760,740 to Blodgett where decoupled polarization channels are isolated to increase data capacity, typically for satellite applications. This is also shown in U.S. Pat. No. 6,445,926 to Boch et al. which shows how this technique can be used for other types of fixed receivers. However, both of these implementations require fixed knowledge about the orientation of both transceivers.

Using multiple polarizations to increase SNR and using fixed antenna orientations to increase data rate are both limited by the fact that the relative orientation of the transmit and receive antennas must be known. Therefore, these methods are generally only applicable to stationary receivers. Smaller devices, such as mobile phones and small satellite receivers therefore cannot take advantage of these polarization-based techniques for increased link quality and data rate.

Methods exist for increasing the apparent channel capacity using polarization techniques for mobile devices. This can be seen in U.S. Pat. No. 6,418,316 to Hildebrand et al. which uses geographical separation of different polarizations to decrease interference and allow additional channel capacity for the main transceiver. A similar technique is shown in a patent application by McKay, S R (Publication No. US2007/0010198). However, this method only applies to fixed transceivers with a large number of users (such as cellular phone towers) and only adds useful capacity by splitting the transmit field into separate physical areas based on polarization. This reduces interference on the channel and therefore indirectly increases the link quality for the large transceiver, but does not directly provide for increased data rate to the mobile receiver beyond the spectral bandwidth limit. Although this provides increased channel availability when multiple users are involved, the maximum data rate for any single mobile use remains the same.

SUMMARY

In accordance with one embodiment, a mobile transceiver uses measured knowledge of its position and/or orientation to increase channel capacity by using polarization of the wireless channel.

DRAWINGS

Figures

Figure 1:
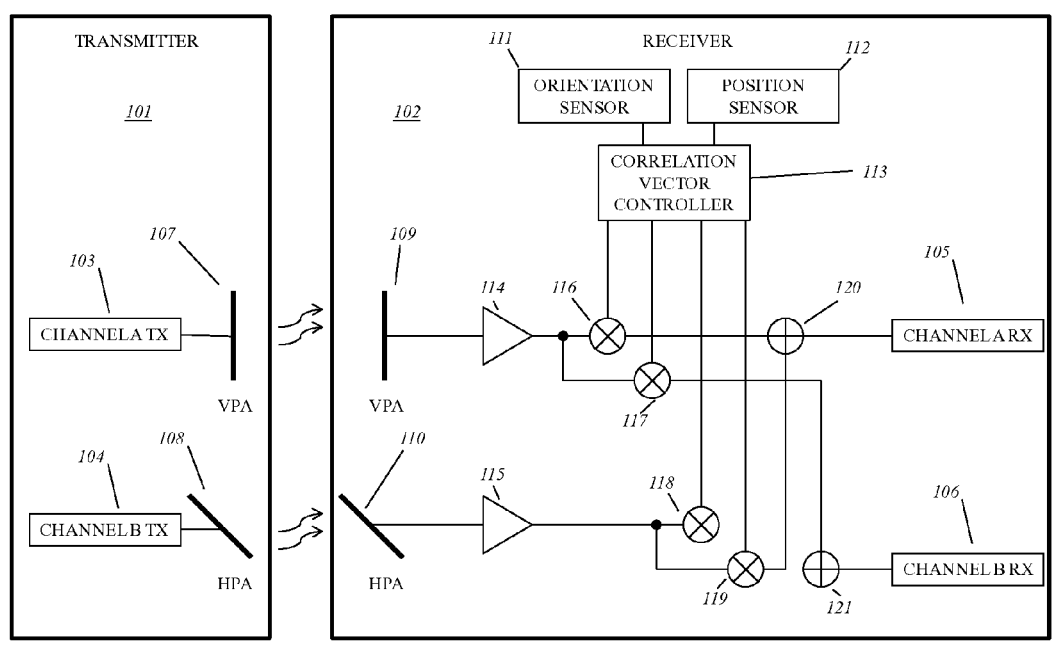
FIG. 1 shows a block diagram of a transmitter/receiver pair utilizing position and/or orientation information to send data on both horizontally and vertically polarized channels.

| DRAWINGS - Reference Numerals | |
|---|---|
| 101 | radio transmitter |
| 102 | radio receiver |
| 103 | channel 'A' transmit side |
| 104 | channel 'B' transmit side |
| 105 | channel 'A' receive side |
| 106 | channel 'B' receive side |
| 107 | vertically polarized antenna |
| 108 | horizontally polarized antenna |
| 109 | vertically polarized antenna |
| 110 | horizontally polarized antenna |
| 111 | orientation sensor |
| 112 | position sensor |
| 113 | correlation vector controller |
| 114 | RF amplifier |
| 115 | RF amplifier |
| 116 | multiplier |
| 117 | multiplier |
| 118 | multiplier |
| 119 | multiplier |
| 120 | summer |
| 121 | summer |
| 201 | remote transceiver position |
| 202 | remote transceiver orientation |
| 203 | local orientation |
| 204 | local position |
| 205 | remote vector computation |
| 206 | local vector computation |
| 207 | correlation factor computation |
| 208 | correlation factor output |

DETAILED DESCRIPTION

First Embodiment

FIGS. 1-2

Figure 2:
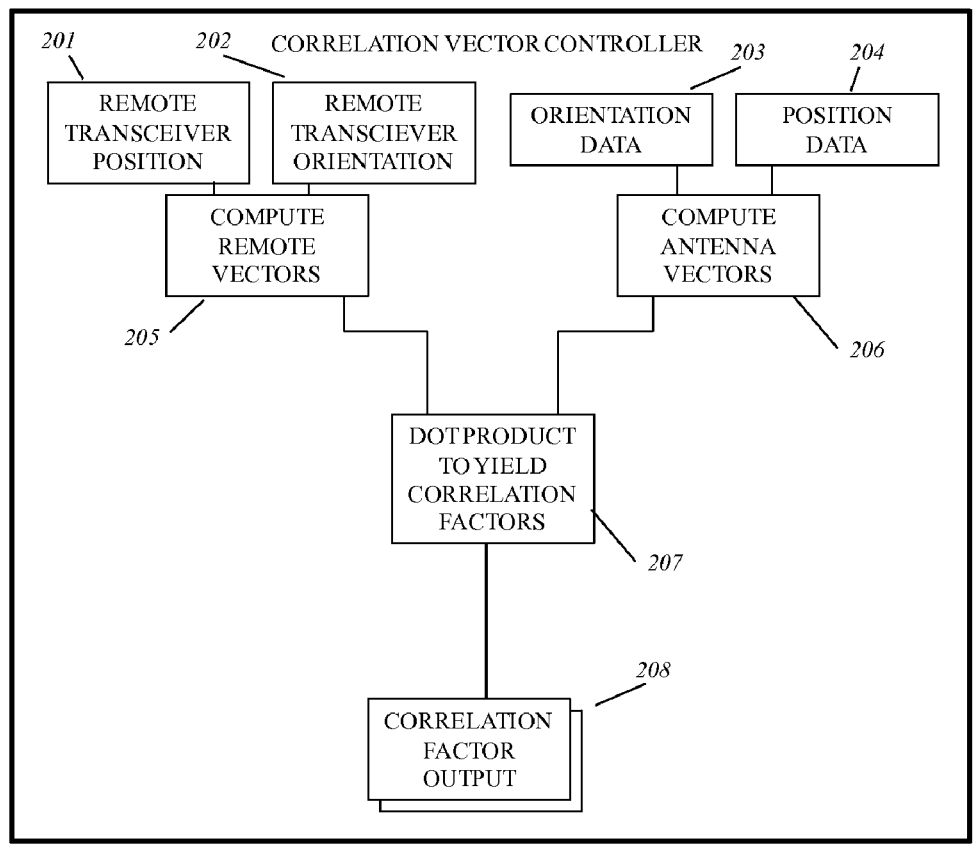
FIG. 2 shows a block diagram for the Correlation Vector Controller block in FIG. 1 numeral 113.

One embodiment of the method is illustrated in FIG. 1 (transmitter/receiver block diagram) with supporting logic in FIG. 2 (correlation vector control logic). The transmitter 101 has two antennas, one vertically polarized 107 and one horizontally polarized 108. These are used to transmit two separate channels, channel 'A' 103 and channel 'B' 104, respectively. Both channels may be transmitted on overlapping parts of the RF spectrum due to the orthogonal nature of the wave polarization. The signals are received by a set of antennas on the receiver 102. Again, one is vertically polarized 109 and one is horizontally polarized 110. However, these are not necessarily in the same orientation as the transmit antennas 107 and 108, so components of both channel 'A' and channel 'B' will be present on both receive antennas.

The received waveforms are then amplified using amplifiers 114 and 115. Using orientation and/or position data obtained from an orientation sensor 111 and optionally a position sensor 112, control logic 113, which may in some embodiments comprise of analog electronics, a microprocessor, or other programmable hardware, computes the expected vector directions of the incident polarized waveforms. Using multipliers 116, 117, 118, and 119 and summers 120 and 121, which in some embodiments may comprise of analog electronics, microprocessors, or programmable hardware, the receiver 102 correlates the incoming RF signals with the expected vector location of the incident polarized waveforms from 113. In the embodiment shown in FIG. 1, this occurs before any future demodulation, however in other embodiments this may occur after demodulation or at intermediate frequencies if any exist.

FIG. 2 shows one embodiment of data process flow for the correlation vector controller 113. Remote transceiver (in some embodiments a transmit tower) position and orientation data 201 and 202 are used to compute a vector (in block 205) representing the orientation of the remote transceiver antenna(s) 107 and 108. Local measured orientation and position data 203 and 204 are used to compute a vector (in block 206) representing the orientation of the local antenna(s) 109 and 110. These vectors are fed to block 207 where the vectors are combined. In some embodiments this is done with a simple set of dot products, however additional information, such as signal strength or rotational singular values, may be used to refine this estimate. The result of 207 is a set of correlation factors 208 which indicated the relative strengths of each signal channel 103 and 104 on each physically received channel on the mobile antennas 109 and 110. These numbers are used by multipliers 116, 117, 118, and 119 to reconstruct the actual data channels 'A' and 'B' (105 and 106).

The output of this process is the two data streams, channel 'A' 105 and channel 'B' 106, which are the reconstructed versions of the original channels 'A' and 'B' 103 and 104, respectively, plus any induced noise and the residual noise from any correlation or estimation errors.

ADVANTAGES

From the description above, several advantages of some embodiments of the aforementioned method become evident:
(a) The receiver orientation and position do not need to be fixed. Even though the relative polarization of the transmit and receive antennas may change, the original transmitted waveforms can be reconstructed without the need to realign the antennas.
(b) The link capacity of an allocated RF spectrum is effectively doubled.
(c) The system does not preclude the use of a single polarization or non-linear polarizations.
(d) The correlation does not require specific hardware and can take advantage of other components of the receiver (such as microprocessors or programmable gate arrays) for the simple computations required.

CONCLUSION, RAMIFICATIONS, AND SCOPE

Accordingly, the reader will see that the embodiments above allow for increased data rate without increasing the required available spectrum. Unlike previous approaches, these methods are also applicable to mobile devices. More specifically, the method is novel and useful in that:
  mobile receivers without a fixed orientation can take advantage of polarization effects;
  the original transmitted waveforms can be reconstructed without the need to realign or move antennas;
  the link capacity of an allocated RF spectrum is effectively doubled;
  the system does not preclude the use of a single polarization or non-linear polarizations;
  the correlation does not require specific hardware and can take advantage of other components of the receiver.

Although the description above contains many specificities, these should not be construed as limiting the scope of the embodiments but as merely providing illustrations of some of the presently preferred embodiments. For example, correlation can occur after demodulation, sensors other than orientation and position sensors may be used, other polarizations may be used, etc.

Thus the scope of the embodiments should be determined by the appended claims and legal equivalents, rather than by the examples given.

I claim:

1. A communication system, comprising:
   (a) a mobile unit operatively coupled to at least one antenna, said antenna(s) configured to transmit electromagnetic waves having a polarization state fixed with respect to said mobile antenna(s) and receive electromagnetic waves having an arbitrary polarization;
   (b) a remote transceiver operatively coupled to a multitude of antennas, said antennas configured to transmit electromagnetic waves having a fixed polarization state with respect to said transceiver and receive electromagnetic waves having an arbitrary polarization;
   (c) at least one sensor for sensing the orientation of said mobile unit with respect to a fixed reference frame where at least one of said sensors is located on said mobile unit
   (d) a means for using the output of said sensor to resolve the relative orientation of said mobile unit and said remote transceiver,
   (e) a means for using said relative orientation to decouple incident polarized electromagnetic signals on said antenna(s) of said mobile unit,
   (f) (a) at least one sensor for sensing the position of said mobile unit with respect to a fixed reference frame,
   (g) (b) a means for using said position and said relative orientation to decouple incident polarized electromagnetic signals on said antenna(s) of said mobile unit.

2. The communication system of claim 1 where at least one of said position sensors is selected from the group consisting of Global Positioning System (GPS) receivers and methods for cellular tower triangulation.

3. A communication system, comprising:
   (a) a mobile unit operatively coupled to at least one antenna, said antenna(s) configured to transmit electromagnetic waves having a polarization state fixed with respect to said mobile antenna(s) and receive electromagnetic waves having an arbitrary polarization;
   (b) a remote transceiver operatively coupled to a multitude of antennas, said antennas configured to transmit electromagnetic waves having a fixed polarization state with respect to said transceiver and receive electromagnetic waves having an arbitrary polarization;
   (c) at least one sensor for sensing the orientation of said mobile unit with respect to a fixed reference frame where at least one of said sensors is located on said mobile unit where said orientation sensor is selected from the group consisting of accelerometers, compasses, inclinometers, and gyroscopes,
   (d) a means for using the output of said sensor to resolve the relative orientation of said mobile unit and said remote transceiver,
   (e) a means for using said relative orientation to decouple incident polarized electromagnetic signals on said antenna(s) of said mobile unit.

4. A method of increasing wireless channel capacity of a transceiver
   (a) providing at least one orientation sensor for said transceiver,
   (b) providing at least one antenna for said transceiver with a known polarization relative to said transceiver,
   (c) providing a means for communication using electromagnetic waves with a base station, where said base station consists of a second transceiver with a plurality of antennas with a known polarization relative to said base station,
   (d) producing at least one measurement for said transceiver orientation relative to a fixed reference frame wherein at least one of said measurements is produced by said transceiver, and where said orientation sensor(s) is/are selected from the group consisting of accelerometers, compasses, inclinometers, and gyroscopes,
   (e) producing an estimate for the relative orientation of said transceiver and said base station using said measurement(s),
   (f) isolating and receiving electromagnetic transmissions transmitted by said base station at different polarizations using said relative orientation estimate, whereby channel capacity can be increased by correlating incident signals with their expected polarization.

\* \* \* \* \*